United States Patent [19]

Bailey et al.

[11] Patent Number: 4,489,687
[45] Date of Patent: Dec. 25, 1984

[54] PISTON HAVING FUEL DIVERTING BARRIER MEANS

[75] Inventors: John M. Bailey, Dunlap; Dale L. Lindenfelser, Tremont, both of Ill.

[73] Assignee: Caterpillar Tractor Co., Peoria, Ill.

[21] Appl. No.: 533,039

[22] Filed: Sep. 16, 1983

[51] Int. Cl.³ .............................................. F02B 19/14
[52] U.S. Cl. .................................. 123/269; 123/193 P
[58] Field of Search ................... 123/193 P, 253, 269, 123/276, 280, 286, 289, 668, 669, 298

[56] References Cited

U.S. PATENT DOCUMENTS

| | | | |
|---|---|---|---|
| 2,243,263 | 5/1941 | Starr | 123/276 X |
| 2,766,738 | 10/1956 | Hoffmann | 123/269 |
| 3,035,559 | 5/1962 | Brandes et al. | 123/269 |
| 3,039,445 | 6/1962 | Crowther et al. | |
| 3,057,334 | 10/1962 | Bailey | 123/269 |
| 3,083,700 | 4/1963 | Madak et al. | |
| 3,111,117 | 11/1963 | Gotz | 123/269 |
| 3,132,633 | 5/1964 | Zimmerman | |

FOREIGN PATENT DOCUMENTS

| | | | |
|---|---|---|---|
| 1308400 | 9/1962 | France | |
| 56246 | 11/1921 | Sweden | 123/193 P |
| 807633 | 1/1959 | United Kingdom | 123/280 |

Primary Examiner—Tony M. Argenbright
Attorney, Agent, or Firm—John W. Grant

[57] ABSTRACT

Heat plugs made of durable, heat resistant material are useful for protecting aluminum pistons from the jet flame of burning fuel emitted from the precombustion chamber of some compression ignition engines. However, when slower burning fuel such as vegetable oil is burned, unburned fuel is sometimes deflected by the heat plug against the adjacent cylinder bore where it dilutes the lubricating oil and causes high wear to that portion of the bore and to the piston rings. The subject heat plug (26) is provided with a barrier (37) which prevents unburned fuel from being deflected against a portion of the cylinder bore (12) nearest the heat plug. Thus, that unburned fuel remains in the burning gaseous mixture in the combustion chamber and is burned during the combustion process within the combustion chamber.

15 Claims, 4 Drawing Figures

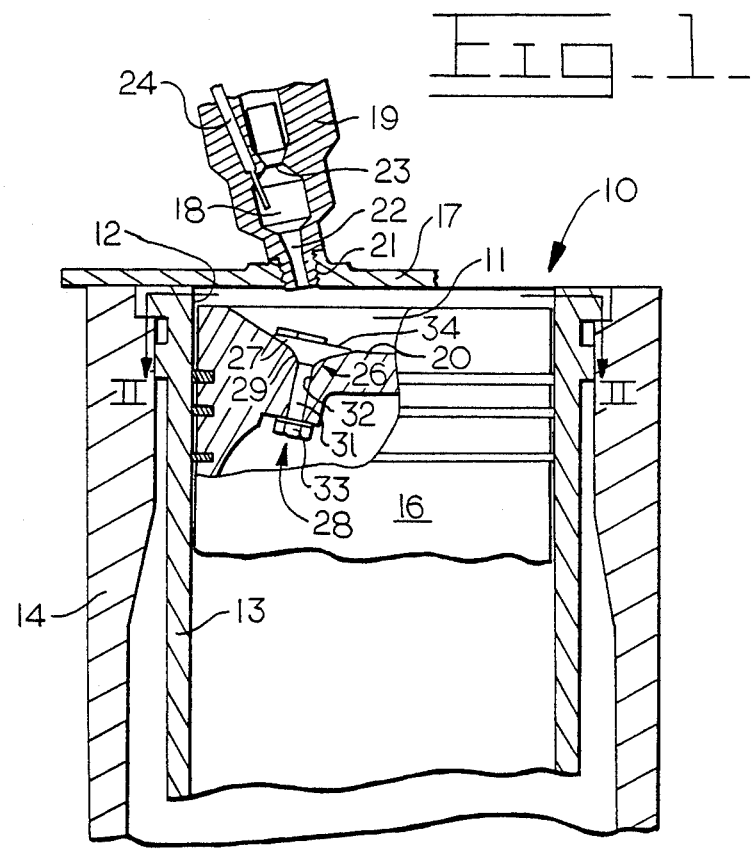

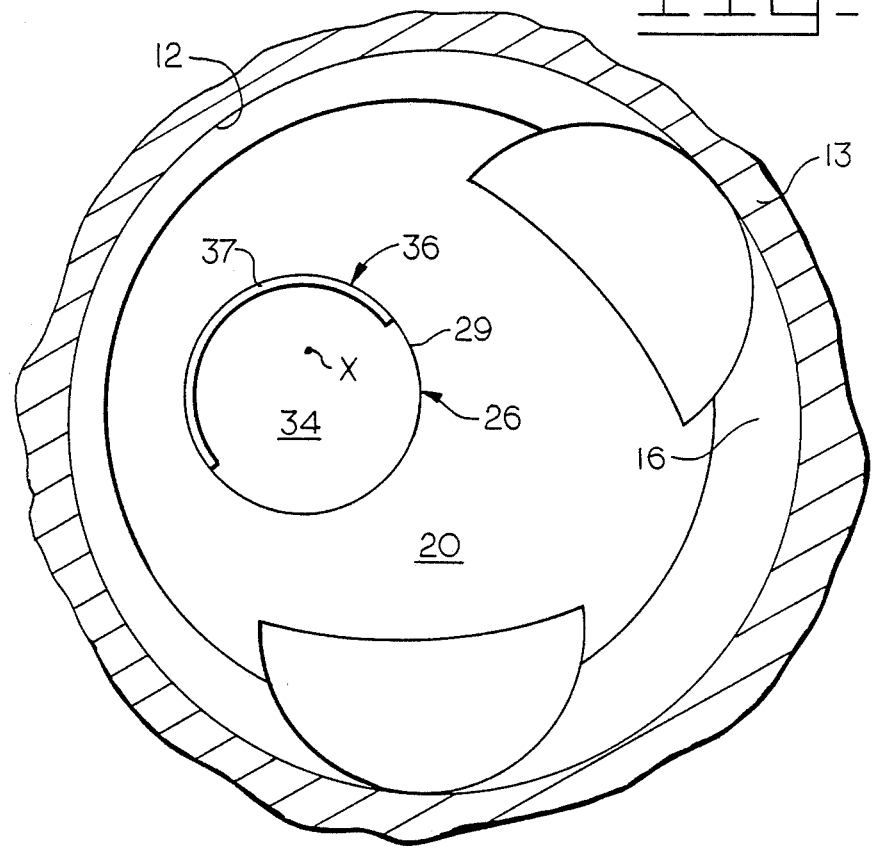
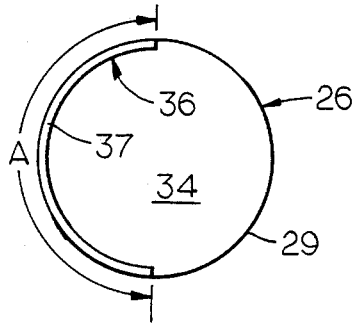 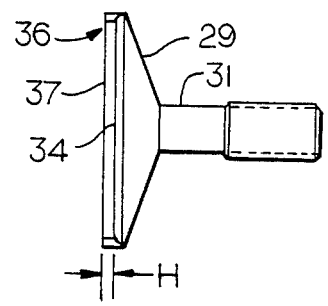

4,489,687

PISTON HAVING FUEL DIVERTING BARRIER MEANS

TECHNICAL FIELD

This invention relates generally to an internal combustion engine and more particularly to a piston having a barrier means for preventing unburned fuel from impinging against the cylinder bore.

BACKGROUND ART

The low supply of petroleum based fuels in many countries has revived the interest for the development of alternative fuels or extenders for replacing or supplementing petroleum based fuels. The use of vegetable oils or blends of vegetable oils in diesel fuel appear promising for diesel engines. In particular, a large amount of test data has been accumulated burning various soybean oil/diesel fuel blends in various diesel engine configurations. The engines showing the most promise with the least modifications are those having precombustion chambers. Acceptable performance and durability have been achieved with four valve engines having centrally located precombustion chambers. However, it was found that two valve engines having a precombustion chamber located nonsymmetric or offset with respect to the main combustion chamber were susceptible to increased wear to the piston rings and the cylinder bore. Such high piston ring and cylinder bore wear has been attributed to fuel impingement on the cylinder bore due to the poorer atomization and slower burning characteristics of the vegetable oil. The partially burned fuel impinging against the cylinder bore results in high dilution of the lubricating film and heavy deposits on the piston rings and cylinder bore which lead to ring sticking, corrosion and wear.

In order to effectively burn vegetable oil or blends of vegetable oil and petroleum based fuel, it became apparent that modifications to some of the engine components would be necessary. One of the considerations in modifying the engine is that such modifications should not unduly hinder the burning of straight petroleum based diesel fuel.

The present invention is directed to overcoming one or more of the problems as set forth above.

DISCLOSURE OF THE INVENTION

In one aspect of the present invention an internal combustion engine has a main combustion chamber partially defined by a cylinder bore, a piston defining a movable wall of the main combustion chamber and a precombustion chamber having a throat through which a stream of combustible fuel and air is directed into the main chamber and impacts against the piston at an impact point offset from the center of the piston. A barrier means is provided for preventing unburned fuel from being deflected against the portion of the cylinder bore nearest the impact point on the piston.

In another aspect of the present invention an internal combustion engine has a main combustion chamber partially defined by a cylinder bore, a piston defining a movable wall of the main combustion chamber, a heat plug connected to the piston at a location offset from the center of the piston, and a precombustion chamber having a throat through which a stream of combustible fuel and air is directed toward the heat plug for impingement thereagainst. A barrier means is provided for preventing unburned fuel from being deflected against a portion of the cylinder bore nearest the heat plug.

In another aspect of the present invention, a heat plug is adapted to be connected to a piston of an internal combustion engine having a precombustion chamber in communication with a main combustion chamber through a throat. The heat plug comprises a circular portion having opposite sides thereon, means associated with one of said sides for connecting the heat plug to the piston and a crescent shaped barrier connected to and extending outwardly from the other side of the circular portion.

The present invention provides a device for permitting vegetable oils to be used as fuel in diesel engines and for preventing unburned fuel from impinging against the cylinder bore where it would tend to form deposits and dilute the lubricating oil film on the wall with consequent corrosion and wear. This is accomplished by providing a barrier positioned between the point at which unburned fuel impacts against the piston or heat plug and the portion of the cylinder bore nearest such impact point. The barrier thus prevents the unburned fuel from being deflected against that portion of the cylinder bore and causes the unburned fuel to remain suspended within the burning gaseous mixture longer so that a more complete combustion occurs.

BRIEF DESCRIPTION OF THE DRAWINGS

FIG. 1 is a diagrammatic cross-sectional view of an embodiment of the present invention;

FIG. 2 is a sectional view taken along line II—II of FIG. 1;

FIG. 3 is a plan view of the heat plug embodying the present invention; and

FIG. 4 is a side elevational view of the heat plug of FIG. 3.

BEST MODE FOR CARRYING OUT THE INVENTION

Referring now to FIG. 1 of the drawings, one cylinder and the associated components of a compression ignition internal combustion engine is generally indicated by the reference numeral 10. The cylinder includes a main combustion chamber 11 partially defined by a cylinder bore 12 formed within a cylinder liner 13. The cylinder liner 13 is suitably fitted within a cylinder block partially shown at 14. A piston 16 is reciprocatably positioned within the cylinder bore 12 and has a surface 20 which defines a movable wall of the combustion chamber 11. A cylinder head partially shown at 17 is suitably connected to the cylinder block 14 and defines a fixed wall of the combustion chamber 11.

A precombustion chamber 18 is formed in a cylindrical member 19 which is connected to the cylinder head 17 by a threaded connection 21. The precombustion chamber 18 is communicated with the main combustion chamber 11 through a throat 22. The tip of an injection nozzle 23 and a glow plug 24 extend into the precombustion chamber 18 in the usual manner.

Referring also to FIGS. 2–4, the piston 16 has a heat plug 26 connected thereto at a location offset from the center of the piston and substantially in axial alignment with the throat 22 of the cylindrical member 19. The heat plug 26 has an circular portion 27 and a means 28 associated with one side 29 thereof for connecting the heat plug to the piston. The means 28 includes a stem 31 extending through a passage 32 in the piston 16 and a nut 33 threaded onto the distal end of the stem 31. The circular portion 27 has another side 34 facing away from the piston 16 and which forms a portion of the surface 20 of the piston.

A means 36 is provided for preventing unburned fuel from being deflected against a portion of the cylinder bore 12 nearest the heat plug 26. The means 36 includes an elongated semi-circular or crescent shaped barrier 37 connected to and extending outwardly from the side 34 of the circular portion 27. The barrier 37 is concentrically positioned adjacent the portion of the outer periphery of the circular portion 27 that is nearest the cylinder bore. The barrier 37 has a height "H" in the range of from about 1 to 3 millimeters above the side 34 and preferably about 1.5 millimeters. The arcuate length "A" of the barrier 37 is in the range greater than 150° and less than 360° and preferably about 180°.

Alternatively, on pistons not having heat plugs, the means 36 includes the barrier 37 positioned in the path of unburned fuel deflected from the impact point toward a portion of the cylinder bore 12 nearest the impact point. The barrier 37 can either extend outwardly from the surface 20 or can be a recess formed in the surface 20 of the piston with such recess having a wall portion similar in shape to the barrier 37 of FIG. 2.

INDUSTRIAL APPLICABILITY

In the operation of the present invention, fuel is injected into the precombustion chamber 18 from the fuel injection nozzle 23 as the piston 16 approaches the top dead center position of its compression stroke. Autoignition of the fuel is started in the precombustion chamber and a stream of partially burned fuel, air, and products of combustion is directed through the throat 22 into the main combustion chamber 11. The fuel continues to burn upon entering the main combustion chamber 11. However, some of the unburned fuel impacts against the side 34 of the heat plug 26 at a point "X" and is deflected radially outwardly in a circular pattern from the point of impact on the side 34. The fuel deflected toward the portion of the cylinder bore 12 nearest to the heat plug 26 impinges against the barrier 37 and is diverted by the barrier away from that portion of the cylinder bore. The fuel thus diverted by the barrier remains temporarily suspended within the burning gaseous mixture in the combustion chamber and is eventually burned during the combustion process.

In view of the above, it is readily apparent that the structure of the present invention provides an improved piston having a barrier which causes a more complete combustion of the fuel entering the combustion chamber from the precombustion chamber. The barrier prevents unburned fuel from being deflected against a portion of the cylinder bore nearest the heat plug or the point of impact of the fuel on the piston. Such diverted fuel is then eventually burned during the combustion process. Thus, the barrier prevents unburned fuel from impinging against the cylinder bore thereby minimizing the formation of deposits and dilution of the lubricating oil film on the cylinder bore which leads to corrosion and wear.

By using the piston with the barrier, alternative fuels such as vegetable oil and blends of vegetable oil and petroleum based fuel can be burned with negligible effect on the performance and durability of the engine. Moreover, the barrier will not hinder the use of straight petroleum base fuel.

Other aspects, objects and advantages of this invention can be obtained from a study of the drawings, the disclosure and the appended claims.

We claim:

1. In an internal combustion engine having a main combustion chamber (11) partially defined by a cylinder bore (12), a piston (16) defining a movable wall of the main combustion chamber (11), and a precombustion chamber (18) having a throat (22) through which a stream of combustible fuel and air is directed into the main combustion chamber (11) and toward the piston for impacting thereagainst at an impact point offset from the center of the piston, the improvement comprising:

barrier means (36) for preventing unburned fuel from being deflected against a portion of the cylinder bore (12) nearest the impact point on the piston.

2. In an internal combustion engine having a main combustion chamber (11) partially defined by a cylinder bore (12), a piston (16) defining a movable wall of the main combustion chamber, a heat plug (26) connected to the piston at a location offset from the center of the piston, and a precombustion chamber (18) having a throat (22) through which a stream of combustible fuel and air is directed into the main combustion chamber (11) and toward the heat plug (26) for impacting thereagainst, the improvement comprising:

barrier means (36) for preventing unburned fuel from being deflected against a portion of the cylinder bore (12) nearest the heat plug (26).

3. The engine as set forth in claim 2 wherein said heat plug (26) has a circular portion (27) having one side (34) facing away from said piston (16), and said barrier means (36) includes a crescent shaped barrier (37) extending outwardly from said one side.

4. The engine as set forth in claim 3 wherein said barrier (37) is positioned adjacent an outer periphery of said circular portion (27) nearest to said portion of said cylinder bore.

5. The engine as set forth in claim 4 wherein said barrier (37) has an arcuate length greater than 150° but less than 360°.

6. The engine as set forth in claim 4 wherein said barrier (37) has an arcuate length of about 180°.

7. The engine as set forth in claim 4 wherein said barrier (37) has a height in the range of from about 1 to 3 millimeters.

8. The engine as set forth in claim 4 wherein said barrier has a height of about 1.5 millimeters.

9. A heat plug (26) of the type adapted to be connected to a piston (16) of an internal combustion engine having a main combustion chamber (11) and a precombustion chamber (18) in communication with the main combustion chamber through a throat (22), comprising:

a circular portion (27) having opposite sides (29,34) thereon;

means (28) associated with one of said sides for connecting the heat plug (26) to the piston (16); and a crescent shaped barrier (37) connected to and extending outwardly from the other side of said circular portion (27).

10. A piston (16) adapted for use in an engine having a main combustion chamber (11) partially defined by a cylinder bore (12) in which the piston is adapted to reciprocate and a precombustion chamber (18) having a throat (22) through which a stream of combustible fuel and air is directed into the main combustion chamber (11) for impacting against the piston at an impact point offset from the center of the piston, said piston comprising:
- a surface (20) on which the impact point is located; and
- a barrier (37) positioned in the path of unburned fuel deflected from the impact point toward a portion of the cylinder bore (12) nearest the impact point.

11. The piston (16) of claim 10 wherein said barrier (37) has a crescent shape and extends outwardly from the surface (20).

12. The piston (16) of claim 11 including a heat plug (26) having a side (34) forming a portion of the surface (20) of the piston, said impact point being located on the side (34) of the heat plug (26).

13. The piston (16) of claim 12 wherein said barrier (37) is connected to and extends outwardly from the side (34) of the heat plug.

14. The piston (16) of claim 11 wherein said barrier (37) has an arcuate length greater than 150° but less than 360°.

15. The piston (16) of claim 14 wherein said barrier (37) has an arcuate length of about 180°.

* * * * *